(12) United States Patent
Gaeta et al.

(10) Patent No.: US 7,538,935 B2
(45) Date of Patent: May 26, 2009

(54) ALL-OPTICAL, CONTINUOUSLY TUNABLE, PULSE DELAY GENERATOR USING WAVELENGTH CONVERSION AND DISPERSION

(75) Inventors: Alexander Gaeta, Ithaca, NY (US); Jay E. Sharping, Merced, CA (US); Chris Xu, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 135 days.

(21) Appl. No.: 11/377,921

(22) Filed: Mar. 17, 2006

(65) Prior Publication Data

US 2009/0052011 A1    Feb. 26, 2009

Related U.S. Application Data

(60) Provisional application No. 60/662,391, filed on Mar. 17, 2005.

(51) Int. Cl.
  *G02F 1/35* (2006.01)
  *G02F 2/02* (2006.01)
  *H04B 10/00* (2006.01)
  *H04B 10/04* (2006.01)
  *H04B 10/12* (2006.01)

(52) U.S. Cl. .................... 359/326; 359/278; 359/330; 398/81; 398/82; 398/148; 398/161; 398/189

(58) Field of Classification Search ............. 359/278, 359/279, 326–332; 398/79, 81, 82, 148, 398/158, 161, 189
  See application file for complete search history.

(56) References Cited

U.S. PATENT DOCUMENTS

| | | | | |
|---|---|---|---|---|
| 5,367,586 | A | * | 11/1994 | Glance et al. ............. 385/24 |
| 6,744,988 | B2 | * | 6/2004 | Leclerc et al. ............ 398/102 |
| 7,206,509 | B2 | * | 4/2007 | Beacken .................. 398/53 |
| 7,266,307 | B2 | * | 9/2007 | Shpantzer et al. ......... 398/193 |

OTHER PUBLICATIONS

Lenz et al, "Optical Delay Lines Based On Optical Filters," IEEE Journal of Quantum Electronics, (vol. 37), (No. 4), (p. 525-532), (Apr. 2001).
Corral et al, "True Time-Delay Scheme for Feeding Optically Controlled Phased-Array Antennas Using Chirped Fiber Gratings," IEEE Photonics Technology Letters, (vol. 9), (No. 11), (p. 1529-1531), (Nov. 1997).
Sakamoto et al, "Variable Optical Delay Circuit Using Wavelength Converters," Electronics Letters, (vol. 37), (No. 7), (p. 454-455), (Mar. 29, 2001).

(Continued)

*Primary Examiner*—Sung H Pak
*Assistant Examiner*—Daniel Petkovsek
(74) *Attorney, Agent, or Firm*—Jones, Tullar & Cooper, P.C.

(57) ABSTRACT

A technique for generating variable pulse delays uses one or more nonlinear-optical processes such as cross-phase modulation, cross-gain modulation, self-phase modulation, four-wave mixing or parametric mixing, combined with group-velocity dispersion. The delay is controllable by changing the wavelength and/or power of a control laser. The delay is generated by introducing a controllable wavelength shift to a pulse of light, propagating the pulse through a material or an optical component that generates a wavelength dependent time delay, and wavelength shifting again to return the pulse to its original wavelength.

16 Claims, 2 Drawing Sheets

OTHER PUBLICATIONS

Wong et al, "Continuous-Wave Fiber Optical Parametric Amplifier With 60 dB Gain Using A Novel Two-Segment Design," IEEE Photonics Technology Letters, (vol. 15), (No. 12), (Dec. 3, 2003).

Su et al, "Wavelength-Tunable All-Optical Clock Recovery Using A Fiber-Optic Parametric Oscillator," Optics Communications, (vol. 184), (p. 151-156), (Oct. 1, 2000).

Blows et al, "Cross-Talk-Induced Limitations of Two-Pump Optical Fiber Parametric Amplifiers," Journal of the Optical Society of America B, (vol. 21), (No. 5), (p. 989-995), (May 2004).

Perlin et al, "All-Fiber Wavelength Conversion Using Cross-Phase Modulation And Bragg Gratings," IEEE Photonics Technology Letters, (vol. 14), (No. 2), (pp. 176-178), (Feb. 2002).

Perlin et al, "Nonlinear Pulse Switching Using Cross-Phase Modulation andn Fiber Bragg Gratings," IEEE Photonics Technology Letters, (vol. 13), (No. 9), (p. 960-962), (Sep. 2001).

Wong et al, "Continuous-Wave Fiber Optical Parametric Wavelength Converter With +40-dB Conversion Efficiency and a 3.8-dB Noise Figure," Optics Letters, (vol. 28), (No. 9), (p. 692-694), (May 1, 2003).

Uesaka et al, "Wavelength Exchange in a Highly Nonlinear Dispersion-Shifted Fiber; Theory and Experiments," IEEE Journal of Selected Topics In Quantum Electronics, (vol. 8), (No. 3), (p. 560-568), (Jun. 2002).

Tang et al, "Microstructure-Fibre-Based Optical Parametric Amplifier With Gain Slope Of Similar To 200 dB/W/km In The Telecom Range," Electronics Letters, vol. 39 (No. 2), p. 195-196, (Jan. 23, 2003).

* cited by examiner (a)

(b)

ALL-OPTICAL, CONTINUOUSLY TUNABLE, PULSE DELAY GENERATOR USING WAVELENGTH CONVERSION AND DISPERSION

CROSS REFERENCE TO RELATED APPLICATIONS

This application claims the benefit, under 35 U.S.C. 119(e) of U.S. Provisional Application No. 60/662,391, filed Mar. 17, 2005, which is hereby incorporated by reference in its entirety. U.S. application Ser. No. 11/123,224, which was filed on May 6, 2005 and is commonly owned with the subject application, discloses subject matter that is related to the subject mater of this application.

GOVERNMENT SPONSORSHIP STATEMENT

This invention was made with Government support from the US Department of the Air Force under Contract No. F49620-03-1-0223. The Government has certain rights in the invention.

BACKGROUND OF THE INVENTION

1. Field of the Invention

The present invention relates in general to a continuously tunable optical pulse delay generator that employs a combination of group velocity dispersion and wavelength conversion to achieve a variable delay.

2. Description of the Background Art

Devices that allow for tunable optical pulse delays are of central importance to numerous fields including optical coherence tomography, ultrafast pulse metrology, radio frequency communications and optical communications. Given the tremendous variety of applications and settings where optical pulse delays are used, it is critical to have a variety of approaches for generating them. Currently there exist several options. The most straightforward approach uses bulk beam splitters and mechanical translation, forcing pulses to traverse a physical length that can be varied in a continuous fashion. The technique can be improved upon by using a resonant structure, such as a Bragg grating or microresonator, so that the pulses traverse the same length many times. Recent advances in fiber Bragg grating design and device packaging have resulted in the demonstration of tunable devices where one varies the group delay by either varying the wavelength of light or by physically changing the period of the grating. Using a fast device to switch pulses out of a recirculating loop is a good way to generate discretely variable delays. Each of the approaches described above has benefits and drawbacks in terms of maximum delay, accuracy of delay, wavelength of operation, speed of operation, pulse distortion, and conceptual complexity.

SUMMARY OF THE INVENTION

The present invention relates to a novel technique for generating variable pulse delays (both positive and negative since the invention can also be used for pulse advancement) that uses one or more linear or nonlinear-optical processes such as cross-phase modulation, cross-gain modulation, self-phase modulation, four-wave mixing or parametric mixing, combined with group-velocity dispersion. The delay is controllable by changing the wavelength and/or power of a control laser. In all embodiments of the invention, the delay is generated by introducing a controllable wavelength shift to a pulse of light, propagating the pulse through a component, such as a dispersive fiber, that generates a wavelength dependent time delay and wavelength shifting again to return the pulse to its original wavelength. Residual pulse distortion can be eliminated by using a compensating fiber or diffraction grating. The change in delay that a pulse experiences is proportional to the wavelength shift that was introduced times the group-velocity dispersion of the dispersive fiber, where the shift can be varied by tuning the wavelength of the pump laser.

A number of preferred embodiments of the invention are disclosed herein. In one preferred embodiment, an all-optical Sagnac interferometer is employed, which includes a ring of optical fiber sections, including: a first wavelength conversion section, which can be a highly-nonlinear dispersion-shifted fiber (HNL-DSF); a dispersive or delay section, which can be a span of dispersion compensating fiber (DCF); and a second wavelength conversion section, which can also be HNL-DSF. A second embodiment also employs the same sections of optical fibers, but arranged in a retroreflecting configuration wherein the pulses are reflected for a second pass through the fiber sections. In a third preferred embodiment, wavelength conversion is accomplished using a fiber-optic parametric amplifier (FOPA). In this embodiment, signal pulses from a tunable pumped, optical-parametric oscillator system are amplified within a span of HNL-DSF, which results in the generation of idler pulses that are spectrally shifted according to $2\omega_p = \omega_s + \omega_i$ where $\omega_p$, $\omega_s$, and $\omega_i$ are the angular frequencies of the pump, signal and idler pulses, respectively. After emerging from the HNL-DSF, the idler pulses propagate forward and back through a span of DCF. The temporal delay that the idler pulses acquire is proportional to the original wavelength shift times the group-velocity dispersion coefficient of the DCF. The idler pulses are then spectrally shifted back to the original signal wavelength using parametric amplification in the reverse direction through the HNL-DSF.

The subject invention combines several key innovations that make it much more flexible and useable than other controllable optical delay devices. Probably the most notable of these innovations is the fact that the delay is generated by using an all-optical process such as cross-phase modulation, cross-gain modulation, four-wave mixing, and/or parametric mixing. As the phrase implies, "all-optical" simply means that the various components employed to implement the delay generator are purely optical devices that operate through interaction of one beam of optical radiation with another beam of optical radiation. This is in contrast to elctro-optical devices, for example, which employ electric signals to control beams of optical radiation.

Other notable innovations or key features of the invention include the following: the delay is continuously tunable by changing the wavelength and/or power of the pump laser; the system can generate gain or amplification in addition to delay; as noted above, the system can be configured to generate pulse advancement (i.e. negative delay) as well as delay; the system preserves phase information present in the signal pulse train; the use of large wavelength shifts (1 nm-200 nm) results in large tunable delays such that the delay can be large relative to the initial signal pulse width; and the system complexity is dramatically reduced by using common-path (i.e., Sagnac, or retroreflecting) configurations. The relative pulse delay can be made large (on the order of 1000 nanoseconds) or small (on the order of 10 femtoseconds), depending upon the delay range and sensitivity desired. At the same time, the output signal wavelength is the same as that of the input, and the delay-to-pulse-width ratio can be greater than 1000.

BRIEF DESCRIPTION OF THE DRAWINGS

The features and advantages of the invention will become apparent from the following detailed description of a preferred embodiment thereof, taken in conjunction with the accompanying drawings, in which.

DETAILED DESCRIPTION OF THE INVENTION

Figure 1:
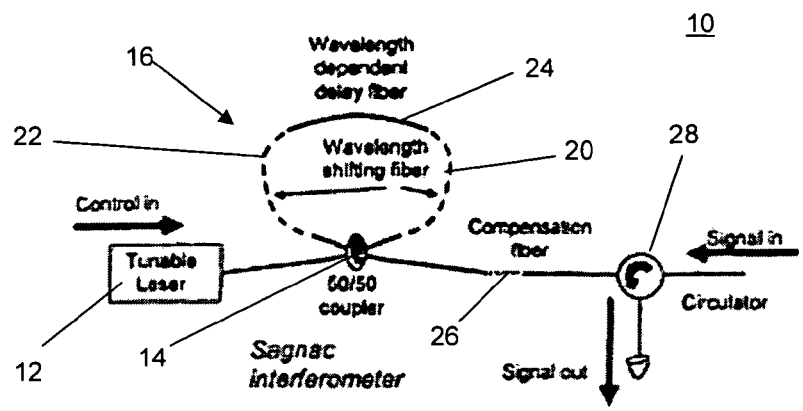
FIG. 1 is a schematic of an all-optical delay generator that is constructed in accordance with a first preferred embodiment of the present invention and employs a Sagnac interferometer.
Figure 2:
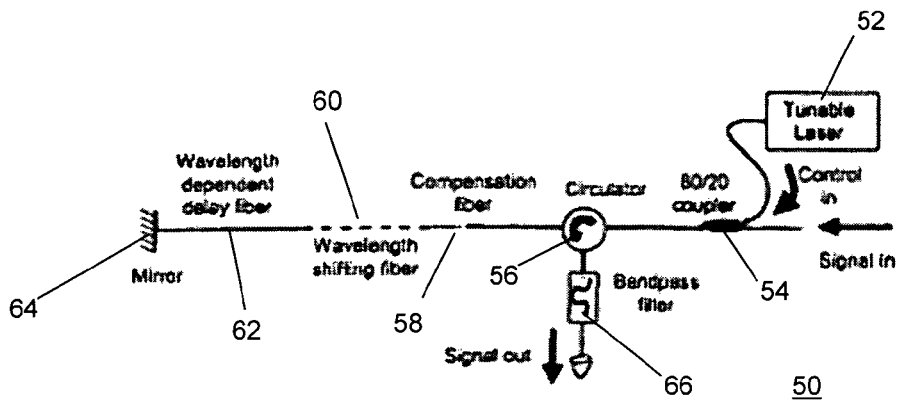
FIG. 2 is a schematic of an all-optical delay generator that is constructed in accordance with a second preferred embodiment of the present invention and employs a linear, retroreflecting configuration.
Figure 3:
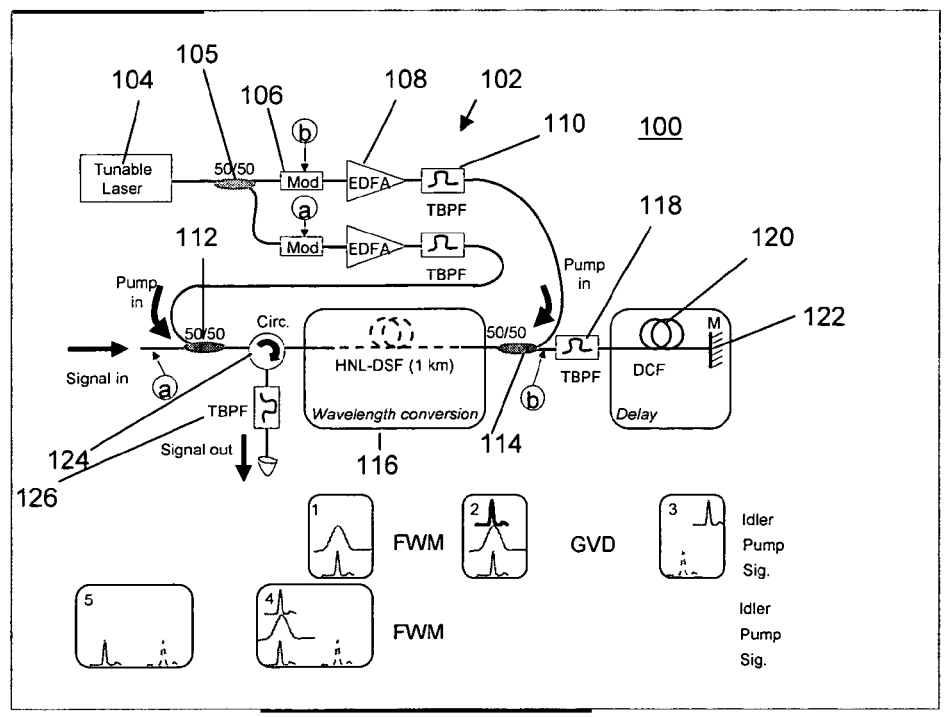
FIG. 3 is a schematic of a continuously tunable all-optical delay generator constructed in accordance with a third preferred embodiment that employs a fiber-optic parametric amplifier (FOPA)

As already noted, the present invention uses one or more linear or nonlinear-optical processes such as cross-phase modulation, cross-gain modulation, four-wave mixing or parametric mixing, combined with group-velocity dispersion for generating variable pulse delays. The delay is controllable by changing the wavelength and/or power of a control laser. FIGS. 1-3 illustrate 3 possible embodiments of such a device, each of which is an "all-optical" delay generator.

With reference first to FIG. 1, an all-optical delay generator 10 is shown in which a tunable laser 12 generates a control signal that is applied along with an input signal pulse to be delayed to 50/50 optical coupler 14 in a Sagnac interferometer 16. The Sagnac interferometer 16 includes first and second sections 20 and 22 of wavelength shifting fiber (e.g. HNL-DSF); and a section of dispersive delay inducing fiber 24 (e.g. DCF). In this embodiment, wavelength conversion or shifting (fiber 20), wavelength dependent delay (fiber 24) and wavelength reconversion or un-shifting (fiber 22) are thus folded into a loop or ring configuration. The Sagnac loop configuration is convenient because it gives a method for combining and subsequently filtering the pump and the signal/idler, though its implementation can be challenging because all of the functions are coupled together. A compensation fiber 26 is used to compensate for pulse broadening effects that usually occur when pulses of light propagate in the presence of dispersion. Finally, a circulator 28 is employed to direct the incoming and outgoing signals as indicated.

Turning now to FIG. 2, another all-optical delay generator 50 is illustrated that is configured in accordance with a second embodiment of the invention. The pulse signal to be shifted and the control or pump signal from a tunable laser 52 are combined in an 80/20 coupler 54 and pass straight through a circulator 56. Next, they pass through a compensation fiber 58, which can be DCF, for example, to handle ahead of time any pulse broadening that will occur in later steps. Next, the pulses pass through a wavelength shifting fiber 60 (e.g. FWM in HNL-DSF) and then through a wavelength dependent delay fiber 62 (e.g. DCF). Next, the pulses reflect off of a mirror 64 and propagate from left to right. They go again through the wavelength dependent delay fiber 62 and then are wavelength shifted back to the original signal wavelength by the HNL-DSF 60. Pulse broadening is further compensated in the compensation fiber 58 and finally the signal is taken out of the system using the circulator 56 and passed through an optical bandpass filter 66 to remove any residual pump or idler that may be left over.

There are numerous variations on the designs of FIGS. 1 and 2 which may include Faraday rotator mirrors for retroflection, tunable fiber Bragg gratings for coarse delay adjustment, soliton pulse propagation to negate temporal pulse broadening and multiple control lasers to achieve polarization-independent operation.

With reference to FIG. 3, an FOPA based continuously tunable optical delay generator 100 is illustrated that is constructed in accordance with a third preferred embodiment. This embodiment was actually constructed for use in an experiment to verify operation of the present invention as will be discussed later in conjunction with FIGS. 4 and 5. The laboratory use of FOPA technology is becoming commonplace and there are many potentially useful FOPA devices that have been proposed for use in communication systems. Examples include broadband amplifiers, signal regenerators and wavelength converters.

The optical delay generator 100 of FIG. 3 is actually quite similar in the design to the generator 50 of FIG. 2. The main differences are that the generator 100 requires injection of another control or pump signal for the wavelength reconversion and tunable bandpass filters are added to reduce noise.

The optical delay generator 100 includes an FOPA 102 that is formed by a tunable CW laser 104, a first 50/50 coupler 105 that splits the control signal from the laser 104 along two paths, first and second amplitude modulators 106, first and second EDFAs 108 (erbium doped fiber amplifiers), first and second TBPFs 110 (tunable bandpass filters), second and third 50/50 couplers 112 and 114, and a 1 km long HNL-DSF 116 for wavelength conversion. It should be noted that the two signal paths (a and b) are needed to suppress another nonlinear optical effect called Brillouin scattering. The presence of Brillouin scattering will significantly reduce the efficiency of wavelength conversion. To provide the desired pulse delay, the FOPA 102 is interfaced through the second 50/50 coupler 114 and another TBPF 118 through a DCF 120 and a mirror 122.

The graphical illustrations of pulses labeled 1 through 5 in FIG. 3 depict the evolution of the pulse delay through the generator 100. In summary, (1) synchronous pump and signal pulses enter the system; (2) wavelength conversion due to four-wave mixing (FWM) results in an idler pulse synchronous with respect to the pump and signal; (3) propagation through DCF 120 results in a time-shifted idler with respect to the original signal (which has been filtered away, but is shown as a dotted pulse); (4) wavelength conversion results in a new pulse at the original signal wavelength which is synchronous with respect to the idler, and (5) the pump and idler are filtered from the signal pulse.

With reference now to the operation of the generator 100 in greater detail, signal pulses of 1.2-ps duration are taken from a tunable Ti:Sapphire-pumped, optical-parametric oscillator system (not shown). A small portion of the signal is detected at point "a", and the detected signal is used to modulate the tunable CW laser 104, which serves as the primary pump laser. The transfer characteristics of the detector and modulators 106 result in pump pulses of roughly 100 ps in duration, thus suppressing Brillouin scattering of the pump within the FOPA 102. The pump pulses are optically amplified and combined synchronously with the signal pulses via the second 50/50 coupler 112. Parametric amplification of the signal pulses within the 1-km-long highly-nonlinear dispersion-shifted fiber (HNL-DSF) 116 results in the generation of idler pulses that are spectrally shifted according to $2\omega_p=\omega_s+\omega_i$ where $\omega_p$, $\omega_s$, and $\omega_i$ are the angular frequencies of the pump, signal and idler pulses, respectively. After emerging from the HNL-DSF 116, the pump and signal pulses are filtered from the idler pulses which then propagate forward and back through the span of dispersion compensating fiber (DCF) 120, which in an exemplary embodiment, was selected to have a group velocity dispersion of −74 ps/nm. The temporal delay that the idler pulses acquire is proportional to the original wavelength shift times the group-velocity dispersion coefficient of the DCF. In a manner similar to that used at the input of the system, a secondary pump is modulated by detecting the photocurrent of the idler at point "b." The idler pulses are now spectrally shifted back to the original signal wavelength using parametric amplification in the reverse direction through the HNL-DSF 116. Finally, after passing through a circulator 124, the pump and idler are filtered from the delayed output signal as it is fed through another TBPF 126.

Figure 4A:
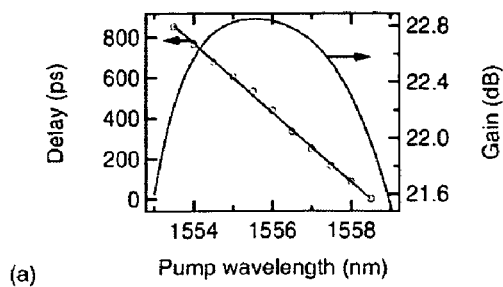
FIG. 4A is a graph showing the experimental results obtained using the FOPA based all-optical delay generator of FIG. 3. Plotted on the left axis are the measured (points) along with a linear fit (line) where delays of 800 ps have been demonstrated. Plotted on the right axis is the expected parametric gain as a function of pump wavelength.
Figure 4B:
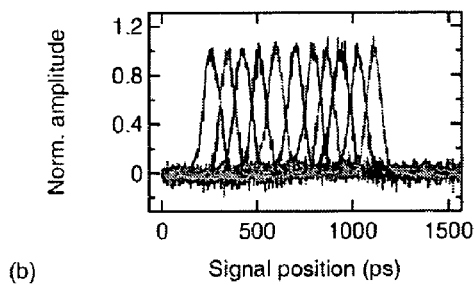
FIG. 4B is a graph showing the corresponding measured temporal traces, as recorded with a 10-GHz detector, of signal pulses for the data points shown in FIG. 4A.

In the actual experiments conducted on the pulse delay generator of FIG. 3, the following results were obtained. The zero-dispersion wavelength for the HNL-DSF used in the experiments was measured to be 1551 nm (plus or minus 2 nm). FIG. 4A shows a plot of the expected parametric gain in a single pass through the HNL-DSF as a function of pump wavelength for a signal wavelength of 1565 nm. The peak pump power used in this calculation was 300 mW, which is consistent with the experimental conditions. The plot indicates that there is appreciable gain for pump detunings as large as 12 nm, corresponding to signal-to-idler wavelength conversions of 24 nm. Also shown in FIG. 4A is the experimentally measured delay of the signal pulses at the output of the system. Temporal traces of the delayed signal output pulse for different pump wavelengths are shown in FIG. 4B. The pulses are still well shaped at the output of the system, and delays in excess of 800 ps have been demonstrated. In principle, by using a DCF with larger GVD, and including the corresponding amount of pulse GVD precompensation compression at the input, delays of thousands of ns can be produced.

Figure 5:
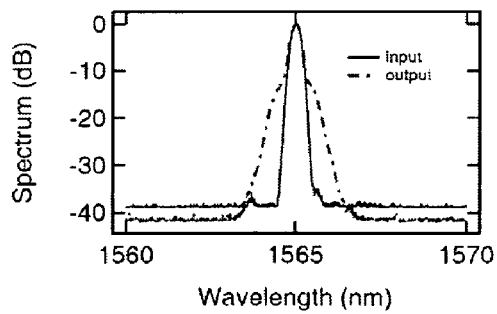
FIG. 5 is a graph showing measured optical spectra for the signal pulses at the input (solid line) and output (dot-dash line) of the delay generator of FIG. 3.

Depicted in FIG. 5 are the optical spectra of the input and the delayed pulses. The central wavelength of the output is exactly the same as the input, which is a consequence of generating the pump pulses for both wavelength conversion stages from the same CW laser. The spectral shape is nearly identical down to 8 dB from the peak, at which point we observe considerable noise in the sidebands. This noise is comprised of a combination of amplified spontaneous emission from the erbium-doped fiber and from the parametric amplifiers. The sidebands can be suppressed to some extent by enhanced filtering of the pump at the input to the system as well as by using a narrower spectral filter at the output. It is also worth noting that the sideband noise observed in FIG. 5 can be reduced by using parametric amplifiers pumped with two phase-modulated CW pump lasers compared with those pumped by a single pulsed laser.

The experiments demonstrated a continuously variable, all-optical pulse delay that operates in the 1.5 μm telecommunication window. Variable nanosecond as well as picosecond delays have been obtained, but the approach is flexible enough to be used to generate either narrower or broader spans of delay, depending on the needs of a particular user. Delays to pulse width ratios of more than 100 have been demonstrated.

Although the invention has been disclosed in terms of a number of preferred embodiment and variations thereon, it will be understood that numerous additional modifications and variations could be made thereto without departing from the scope of the invention as defined in the following claims.

What is claimed is:

1. A method for generating an optical output pulse that is delayed a controllable amount from an optical input pulse comprising the steps of:
   combining said optical input pulse with an optical control signal that interacts with said optical input pulse and forms a first combined optical signal;
   imparting a wavelength shift on said first combined optical signal and thereby forming a wavelength shifted optical signal;
   inducing a delay in said wavelength shifted optical signal that is dependent on a magnitude of said wavelength shift;
   wavelength shifting said delayed and wavelength shifted optical signal back to an original wavelength of said combined optical signal and thereby forming a second combined optical signal; and
   separating said output optical pulse from said second combined optical signal.

2. The method of claim 1, wherein an all-optical process is employed to carry out said wavelength shifting said process being selected from the group comprising cross-phase modulation, cross-gain modulation, self-phase modulation, four-wave mixing and parametric mixing.

3. The method of claim 2, wherein said wavelength shift is applied to said first combined optical signal by passing said first combined optical signal through a nonlinear optical component.

4. The method of claim 3, wherein said step of inducing a delay in said wavelength shifted optical signal comprises propagating at least a portion of said wavelength shifted optical signal through a span of dispersion compensating fiber (DCF).

5. The method of claim 3, wherein said nonlinear optical component comprises a highly-nonlinear dispersion-shifted fiber (HNL-DSF).

6. The method of claim 1, wherein temporal broadening of said optical output pulse is removed by propagating said second combined optical signal through a dispersive component having a group velocity dispersion of opposite sign but the same magnitude as a delay inducing component used to induce the delay in said wavelength shifted optical signal.

7. The method of claim 1, wherein said optical control signal is generated by a laser and said steps are carried out by passing said first combined optical signal through a section of dispersion shifted fiber to impart a wavelength shift to said first combined optical signal; then passing at least a portion of said wavelength shifted optical signal through a section of dispersive compensated fiber to impart a delay to said wavelength shifted optical signal that is dependent on the wavelength of the shifted optical signal; and finally passing said delayed optical signal through a second section of dispersion shifted fiber to shift the wavelength of said delayed optical signal back to the wavelength of the first combined optical signal.

8. A continuously tunable optical delay generator for receiving an optical input pulse and generating an optical output pulse that is delayed a controllable amount from said optical input pulse, said generator comprising:

a source of an optical control signal;

means for combining said optical input pulse with said optical control signal to form a first combined optical signal;

a number of optical components for: 1) imparting a wavelength shift to said first combined optical signal and forming a shifted optical signal; 2) imparting a wavelength dependent delay to said shifted optical signal and forming a delayed optical signal; and, 3) imparting a wavelength shift to said delayed optical signal and generating a second combined optical signal having a wavelength that is the same as a wavelength of said first combined optical signal; and means for separating said delayed optical output pulse from said second combined optical signal.

9. The optical delay generator of claim 8, wherein said generator employs an optical process selected from the group comprising cross-phase modulation, cross-gain modulation, self-phase modulation, four-wave mixing and parametric mixing.

10. The optical delay generator of claim 8, wherein said source of said optical control signal comprises a controllable wavelength pump laser, whereby the amount of delay imparted by said generator is controllable by adjusting the wavelength of said pump laser.

11. The optical delay generator of claim 8, wherein said optical components include at least a first section of highly-nonlinear dispersion-shifted fiber (HNL-DSF) for imparting said wavelength shifts.

12. The optical delay generator of claim 11, wherein said optical components further comprise a dispersive compensated fiber (DCF) for imparting said wavelength dependent delay.

13. The optical delay of claim 12, wherein said optical components include a mirror for reflecting a signal propagated through said HNL-DSF and said DCF back through said DCF and said HNL-DSF to form said second combined optical signal.

14. The optical delay generator of claim 11, wherein said HNL-DSF forms part of a fiber optic parametric amplifier.

15. The optical delay generator of claim 11, wherein said optical components further include a second section of HNL-DSF for forming said second combined optical signal from which said delayed optical output pulse is separated; and, said first section of HNL-DSF, said section of DCF and said second section of HNL-DSF are configured in a loop of a Sagnac interferometer.

16. The optical delay generator of claim 11, further including a compensating fiber for removing temporal broadening of said second combined optical signal that occurs when said shifted optical signal passes through said DCF, said compensating fiber having a group velocity dispersion of opposite sign but the same magnitude as said DCF.

* * * * *